(12) United States Patent
Hein

(10) Patent No.: US 12,708,108 B2
(45) Date of Patent: Aug. 18, 2026

(54) FLY TRAP DEVICE

(71) Applicant: John Hein, Rhinelander, WI (US)

(72) Inventor: John Hein, Rhinelander, WI (US)

( * ) Notice: Subject to any disclaimer, the term of this patent is extended or adjusted under 35 U.S.C. 154(b) by 7 days.

(21) Appl. No.: 19/002,075

(22) Filed: Dec. 26, 2024

(65) Prior Publication Data

US 2026/0182558 A1 Jul. 2, 2026

(51) Int. Cl.
*A01M 1/14* (2006.01)

(52) U.S. Cl.
CPC .................................. *A01M 1/145* (2013.01)

(58) Field of Classification Search
CPC .......... A01M 1/00; A01M 1/023; A01M 1/10; A01M 1/106; A01M 1/12; A01M 5/06
See application file for complete search history.

(56) References Cited

U.S. PATENT DOCUMENTS 4,086,720 A * 5/1978 Wiser .................. A01M 1/2016 362/802
5,311,697 A * 5/1994 Cavanaugh ............. A01M 1/08 43/132.1
5,517,802 A 5/1996 Weder
6,494,020 B2 12/2002 Weder
9,961,891 B2 * 5/2018 Bernhardt ............... A01M 1/12
D834,422 S 11/2018 Gipson
2004/0020104 A1 2/2004 Feldhege
2005/0005503 A1 1/2005 Bragg
2005/0102888 A1 * 5/2005 Curnow .................. A01M 1/04 43/113
2005/0211796 A1 * 9/2005 Lovett ................. A01M 1/2044 239/332
2006/0016120 A1 * 1/2006 Masters .................. A01M 1/14 43/107
2006/0196576 A1 * 9/2006 Fleming ................ A01M 1/245 239/71
2010/0312403 A1 * 12/2010 White .................. G05D 7/0676 340/539.11
2014/0137903 A1 5/2014 Chen
2016/0073622 A1 3/2016 Jany
2020/0022354 A1 * 1/2020 Beaudoin .............. A01M 1/106

FOREIGN PATENT DOCUMENTS

WO WO2018078662 5/2018

* cited by examiner

*Primary Examiner* — Katelyn T Truong

(57) ABSTRACT

A fly trap device for attracting flies with a heat signature and trapping the flies in a fluid includes a basin holding a fluid. The fluid includes a mixture that can adhesively engage and trap an insect contacting the mixture. A housing is positioned in the basin. The housing has an outer surface. The housing includes a metal material that releases an infrared heat signature when the outer surface is exposed to sunlight. The infrared heat signature attracts the insect to the housing. A pump is fluidly coupled to the basin to receive and pressurize the fluid. An outlet hose is fluidly coupled to the pump. A plurality of nozzles is fluidly coupled to the outlet hose and directed toward the housing to dispense the fluid over the housing when the fluid is pressurized. The fluid drains downwardly over the housing into the basin.

16 Claims, 7 Drawing Sheets

FLY TRAP DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fly traps and more particularly pertains to a new fly trap for attracting flies with a heat signature and trapping the flies in a fluid.

(2) Description of Related Art Including Information Disclosed Under 37 CFR 1.97 and 1.98

The prior art relates to fly traps. Insect and fly traps are used in a wide variety of situations. Insect control can be a very important part of farming and ranching. For example, livestock can attract large numbers of flies, mosquitoes, and other biting insects. These biting insects are physically irritating to the livestock and can also carry infectious diseases that harm the livestock. The prior art discloses pesticides and crop rotation strategies for controlling and limiting the biting insect population. However, such devices can pose health and safety risks of their own and have limited efficacy. Thus, there is a need in the art for an effective, environmentally friendly insect trapping device that will not pose a risk to the livestock or the crops being raised on the farm.

BRIEF SUMMARY OF THE INVENTION

An embodiment of the disclosure meets the needs presented above by generally comprising a basin. A fluid is held in the basin. The fluid comprises a mixture of water and an adhesive substance such that the mixture is configured to adhesively engage an insect contacting the mixture for trapping the insect. A housing is positioned in the basin. The housing has an outer surface. The housing comprises a metal material that is configured to release an infrared heat signature when the outer surface is exposed to sunlight wherein the infrared heat signature is configured to attract the insect to the housing. A pump is fluidly coupled to the basin. The pump is configured to receive and pressurize the fluid. An outlet hose is fluidly coupled to the pump wherein the pump releases the fluid through the outlet hose. The outlet hose extends upwardly from the pump to the housing wherein the fluid is released from the outlet hose over the outer surface of the housing. The fluid drains downwardly over the outer surface of the housing into the basin. A plurality of nozzles is fluidly coupled to the outlet hose. The plurality of nozzles is directed toward the outer surface of the housing wherein the plurality of nozzles dispenses the fluid over the housing when the fluid is pressurized.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
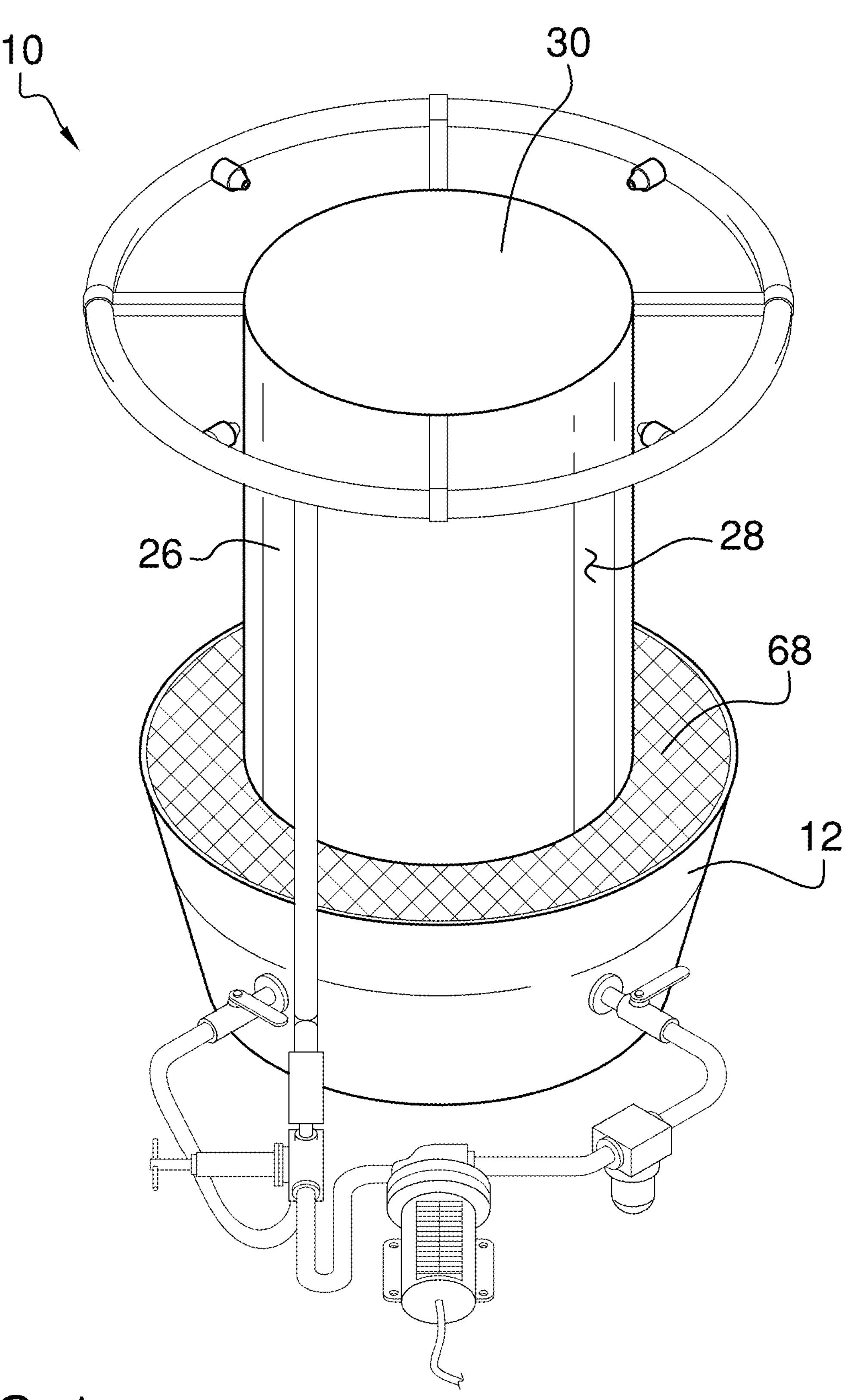
FIG. 1 is an isometric view of a fly trap device according to an embodiment of the disclosure.
Figure 2:
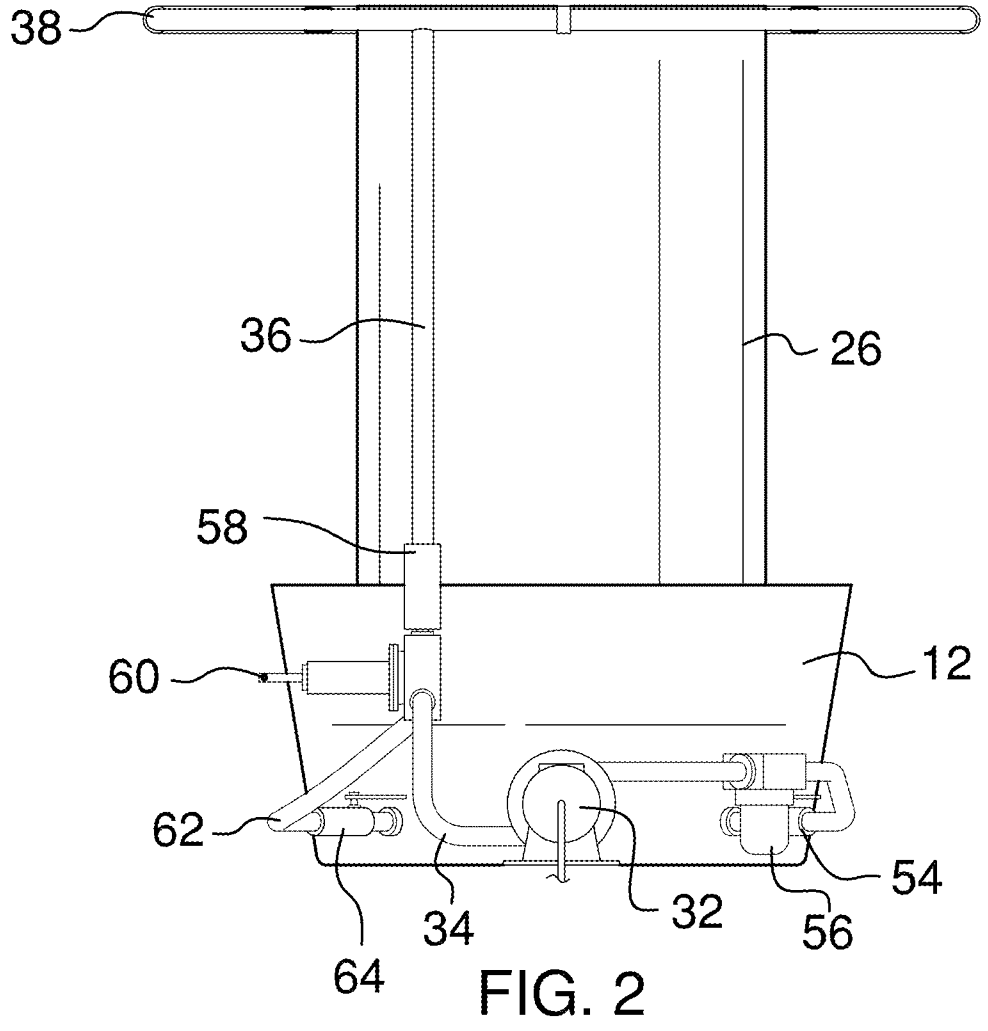
FIG. 2 is a front view of an embodiment of the disclosure.
Figure 3:
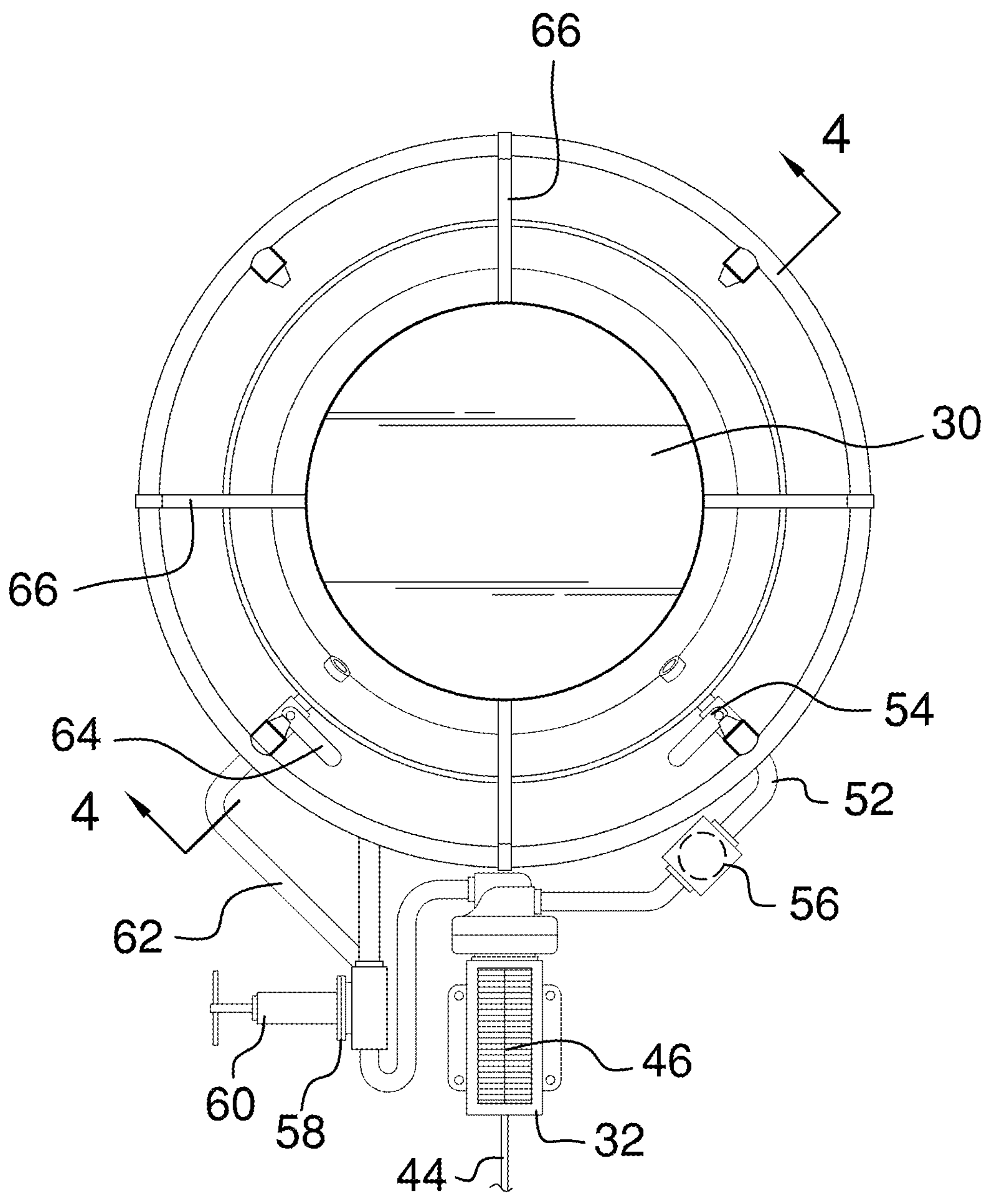
FIG. 3 is a top view of an embodiment of the disclosure.
Figure 4:
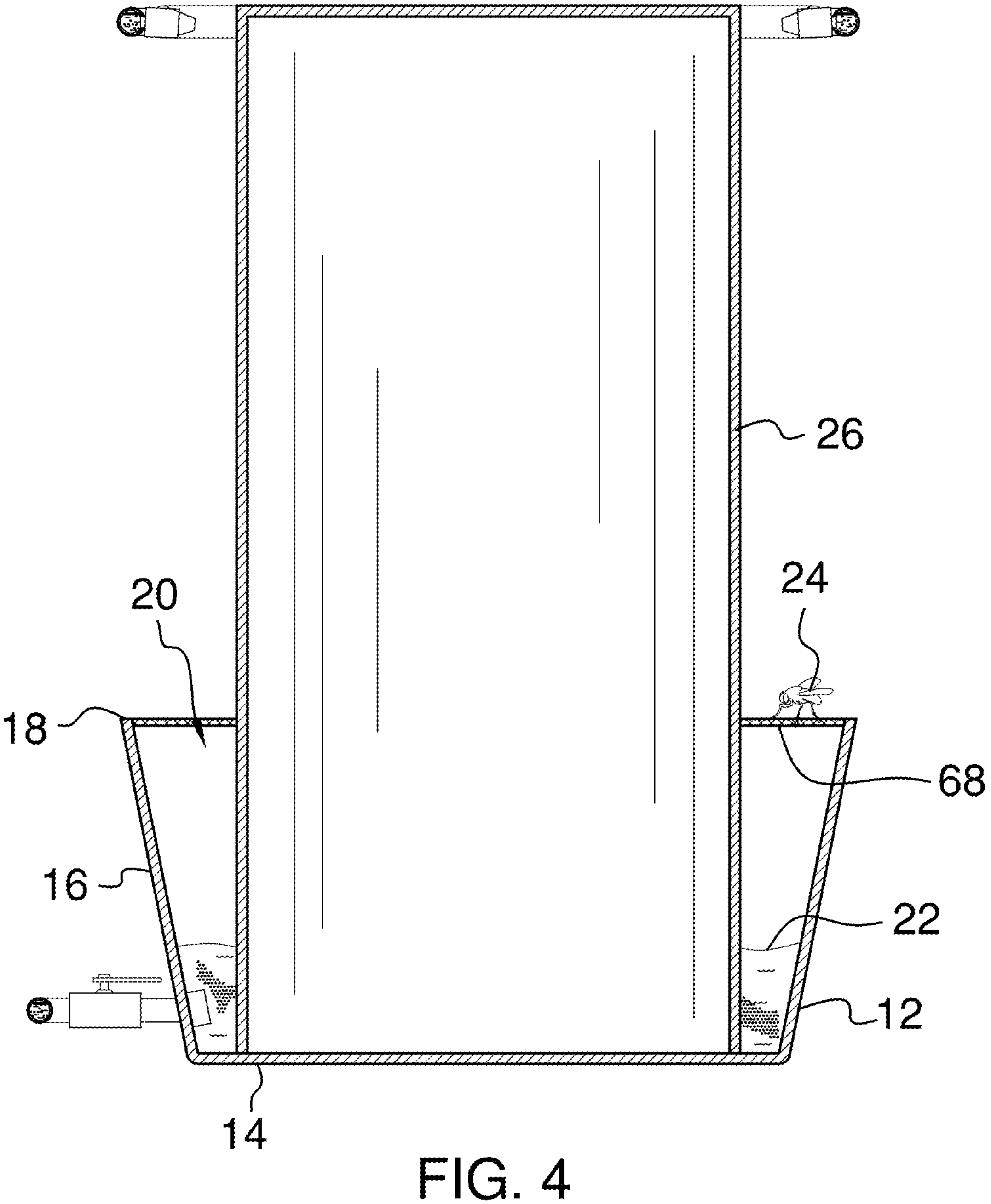
FIG. 4 is a cross-sectional view of an embodiment of the disclosure.
Figure 5:
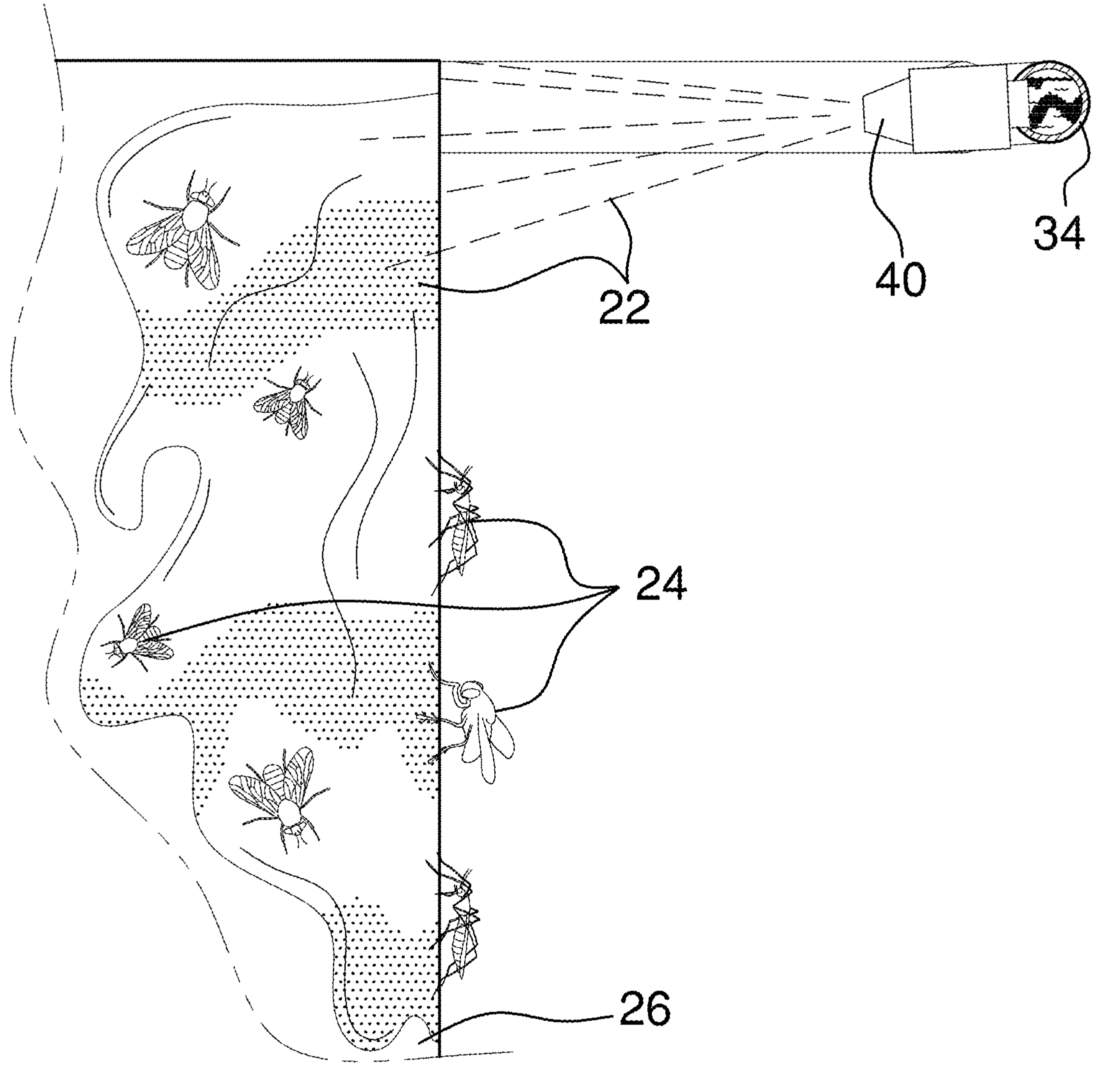
FIG. 5 is an in-use view of an embodiment of the disclosure.

With reference now to the drawings, and in particular to FIGS. 1 through 7 thereof, a new fly trap embodying the principles and concepts of an embodiment of the disclosure and generally designated by the reference numeral 10 will be described.

As best illustrated in FIGS. 1 through 7, the fly trap device 10 generally comprises a basin 12. The basin 12 may have a base wall 14 and a peripheral wall 16 that is coupled to and extends upwardly from the base wall 14. The peripheral wall 16 may have a top edge 18 defining an opening 20 into the basin 12.

A fluid 22 is held in the basin 12. The fluid 22 may comprise a mixture. For example, the mixture may include water and an adhesive substance such that the mixture is configured to adhesively engage an insect 24 contacting the mixture for trapping the insect. For example, the insect 24 may comprise a biting insect such as a biting fly that pesters livestock. The adhesive substance may comprise at least one of a soap, a honey, a non-drying glue, and an oil. The oil may be a tacky oil, for example including at least one of a petroleum jelly and a heavy engine oil. The non-drying glue may comprise TANGLEFOOT®, or other similar adhesive products that can adhesively engage and trap the insect 24. The soap may comprise a dish soap. The mixture should include enough of the adhesive substance to inhibit the insect 24 from disengaging from the mixture and escaping from the fly trap device 10.

Figure 6:
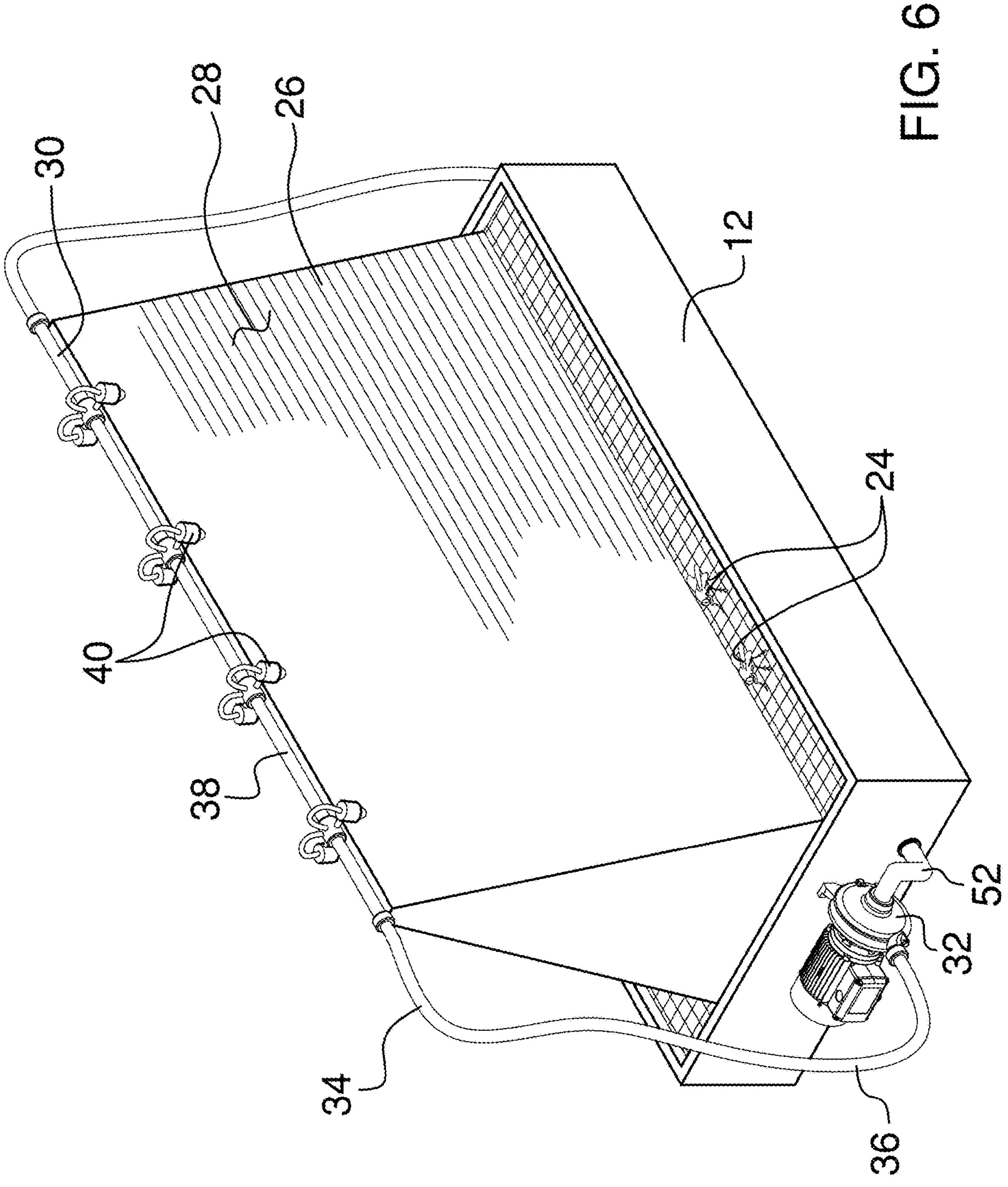
FIG. 6 is an isometric view of an embodiment of the disclosure.
Figure 7:
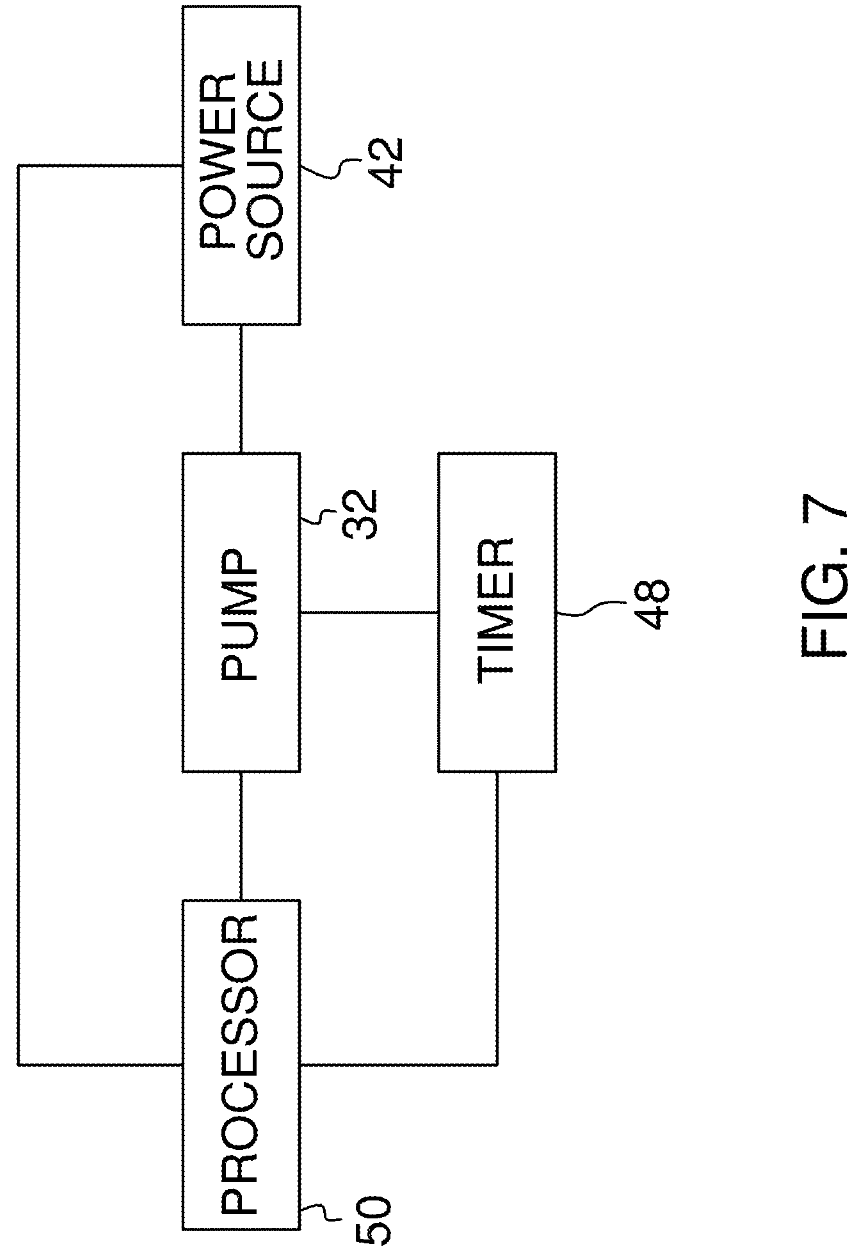
FIG. 7 is a block diagram view of an embodiment of the disclosure.

A housing 26 is positioned in the basin 12. The housing 26 may be coupled to the base wall 14 of the basin 12. The housing 26 generally includes an outer surface 28. The outer surface 28 of the housing 26 may comprise a metal material that is configured to release an infrared heat signature when the outer surface 28 is exposed to sunlight wherein the infrared heat signature is configured to attract the insect 24 to the housing 26. The metal material generally warms up, or increases in temperature, when the outer surface 28 is exposed to sunlight, releasing the heat signature. The insect 24 is attracted to the heat signature produced by the metal material. The housing 26 may have a height exceeding a height of the basin 12 wherein the outer surface 28 of the housing 26 has an upper end 30 that is positioned above the basin 12. The housing 26 may be cylindrical, as shown in FIGS. 1-4, or the housing 26 may be prismatic as shown in FIG. 6. The housing 26 may also have other shapes.

A pump 32 is fluidly coupled to the basin 12. The pump 32 is generally configured to receive and pressurize the fluid 22. The pump 32 may be coupled to the peripheral wall 16 of the basin 12. For example, the pump 32 may be positioned proximate to the base wall 14 of the basin 12 and the pump 32 may extend outwardly from the peripheral wall 16 of the basin 12.

An outlet hose 34 is fluidly coupled to the pump 32 wherein the pump 32 releases the fluid 22 through the outlet hose 34. The outlet hose 34 may extend upwardly from the pump 32 to the housing 26 wherein the fluid 22 is released from the outlet hose 34 over the outer surface 28 of the housing 26. The fluid 22 drains downwardly over the outer surface 28 of the housing 26 and back into the basin 12.

The outlet hose 34 may further comprise a first tube 36 that extends upwardly from the pump 32 to the upper end 30 of the outer surface 28 of the housing 26. A second tube 38 may be fluidly coupled to the first tube 36. The second tube 38 may be aligned with the upper end 30 of the outer surface 28 of the housing 26. The second tube 38 may be coextensive with the upper end 30 of the outer surface 28 of the housing 26 wherein the fluid 22 is expelled over an entirety of the upper end 30 whereby the fluid 22 is configured to coat the outer surface 28 as the fluid 22 drains downwardly over the housing 26 into the basin 12.

A plurality of nozzles 40 may be fluidly coupled to the outlet hose 34. The plurality of nozzles 40 may be directed toward the upper end 30 of the outer surface 28 of the housing 26 wherein the plurality of nozzles 40 dispenses the fluid 22 over the housing 26 when the fluid 22 is pressurized. Each nozzle of the plurality of nozzles 40 may be a misting nozzle.

A power source 42 may be electrically coupled to the pump 32. The power source 42 may be selected from the group comprising a power cord 44 or a solar panel 46. For example, the power cord 44 may extend outwardly from the pump 32, and the solar panel may be positioned on the pump 32.

A timer 48 may be electrically coupled to the pump 32 wherein the pump 32 is actuated upon expiration of the timer 48. For example, the timer 48 may have a duration between 30.0 seconds and 90.0 minutes, to ensure that the outer surface 28 of the housing 26 remains coated with the fluid 22 without requiring the pump 32 to operate continuously. The duration of the timer 48 may be adjustable, for example to account for changes in temperature and humidity which might affect the rate at which the fluid evaporates from the outer surface 28 of the housing 26.

A processor 50 may be electrically coupled to the pump 32. The processor 50 may be electrically coupled to the timer 48. The processor 50 actuates the pump 32 upon expiration of the timer 48. The processor 50 may be electrically coupled to the power source 42.

An inlet hose 52 may be coupled to the basin 12. The inlet hose 52 is fluidly coupled to the pump 32 wherein the fluid 22 is configured to enter the pump 32 through the inlet hose 52.

An inlet valve 54 may be coupled to the inlet hose 52. The inlet valve 54 is openable to permit the fluid 22 to flow into the pump 32 through the inlet hose 52. The inlet valve 54 is able to be closed to inhibit the fluid 22 from flowing into the pump 32 through the inlet hose 41. For example, the inlet valve 54 may comprise a turn-ball valve.

A filter 56 may be fluidly coupled to the inlet hose 52. The filter 56 may be positioned between the basin 12 and the pump 32 wherein the filter 56 is configured to inhibit solids from entering the pump 32. For example, the solids may include the insect 24, such as when the insect 24 has been trapped by the fluid 22 and the fluid 22 has drained down the housing 26 and back into the basin 12.

A pressure gauge 58 may be coupled to the outlet hose 34. The pressure gauge 58 is coupled to the pump 32. Then pressure gauge 58 may be configured to display a pressure of the fluid 22 exiting the pump 32 through the outlet hose 34.

A pressure control 60 may be coupled to the pump 32 wherein the pressure control 60 is configured to facilitate a user in adjusting the pressure of the fluid 22 exiting the pump 32. For example, the user may use the pressure control 60 to increase or decrease the pressure of the fluid 22 exiting the pump 32.

A secondary outlet hose 62 may extend from the pump 32 to the basin 12 wherein an excess amount of the fluid 22 flows into the basin 12 from the pump 32 after the fluid 22 is pressurized to maintain the pressure of the fluid 22 exiting the pump 32. The excess amount of the fluid 22 may be determined by the pressure control 60.

An outlet valve 64 may be coupled to the secondary outlet hose 62. The outlet valve 64 may be openable to facilitate the fluid 22 in flowing into the basin 12 from the secondary outlet hose 62. The outlet valve 64 may be closable to inhibit the fluid 22 from flowing into the basin 12 from the secondary outlet hose 62. For example, the outlet valve 64 may comprise a turn-ball valve.

A plurality of brackets 66 may be coupled to the upper end 30 of the outer surface 28 of the housing 26. The plurality of brackets 66 may be coupled to the outlet hose 34 wherein the plurality of brackets 66 couples the outlet hose 34 to the housing 26.

A grate 68 may be coupled to the basin 12. The grate 68 may be positioned proximate to the top edge 18 of the peripheral wall 16 of the basin 12 wherein the grate 68 covers the opening 20. The grate 68 generally comprises a foraminous material wherein the grate 68 is configured to inhibit the insect 24, or other solid debris, from passing into the basin 12 through the grate 68 whereby the grate 68 is configured to define a collection point for the insect 24 when the insect 24 is trapped by the fluid 22.

In use, the metal material of the outer surface 28 of the housing 26 will warm up in the sunlight, and the heat signature emitted by the warmed metal material will attract the insect 24 to the fly trap device 10. The pump 32 may be actuated to receive the fluid 22 from the basin 12 and pressurize the fluid 22. For example, the pump 32 may be actuated automatically upon expiration of the timer 48. In other embodiments, the pump 32 may be actuated manually. Once pressurized, the fluid 22 is released from the pump 32 through the outlet hose 34. The plurality of nozzles 40 direct the fluid 22 onto the outer surface 28 of the housing 26. For example, the plurality of nozzles 40 may be aimed toward the upper end 30 of the housing 26. Once sprayed onto the housing 26, the fluid 22 will naturally drain downwardly over the housing 26, coating the outer surface 28 and draining back into the basin 12 under the force of gravity. The fluid 22 will adhesively engage the insect 24 that is attracted to, and lands on, the housing 26. The insect 24 will be trapped in the fluid 22. The insect 24 will travel down the outer surface 28 of the housing 26 along with the fluid 22, to the collection point on top of the grate 68.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded.

A reference to an element by the indefinite article "a" does not exclude the possibility that more than one of the element is present, unless the context clearly requires that there be only one of the elements.

I claim:

1. A fly trap assembly comprising:

a basin;

a fluid being held in the basin, the fluid comprising a mixture, the mixture including water and an adhesive substance such that the mixture is configured to adhesively engage an insect contacting the mixture for trapping the insect;

a housing being positioned in the basin, the housing having an outer surface, the housing comprising a metal material being configured to release an infrared heat signature when the outer surface is exposed to sunlight wherein the infrared heat signature is configured to attract the insect to the housing;

a pump being fluidly coupled to the basin, the pump being configured to receive and pressurize the fluid;

an outlet hose being fluidly coupled to the pump wherein the pump releases the fluid through the outlet hose, the outlet hose extending upwardly from the pump to the housing wherein the fluid is released from the outlet hose over the outer surface of the housing, the fluid draining downwardly over the outer surface of the housing into the basin;

a plurality of nozzles being fluidly coupled to the outlet hose, the plurality of nozzles being directed toward the outer surface of the housing wherein the plurality of nozzles dispenses the fluid over the housing when the fluid is pressurized;

a pressure control being coupled to the pump wherein the pressure control is configured to facilitate a user in adjusting the pressure of the fluid exiting the pump; and a secondary outlet hose extending from the pump to the basin wherein an excess amount of the fluid flows into the basin from the pump after the fluid is pressurized to maintain the pressure of the fluid exiting the pump, the excess amount of the fluid being determined by the pressure control.

2. The fly trap assembly of claim 1, further comprising:

the basin having a base wall and a peripheral wall being coupled to and extending upwardly from the base wall, a top edge of the peripheral wall of the basin defining an opening into the basin; and a grate being coupled to the basin, the grate being positioned proximate to the top edge of the peripheral wall of the basin wherein the grate covers the opening, the grate comprising a foraminous material wherein the grate is configured to inhibit the insect from passing into the basin through the grate.

3. The fly trap assembly of claim 1, wherein the housing has a height exceeding a height of the basin.

4. The fly trap assembly of claim 1, wherein the housing is cylindrical.

5. The fly trap assembly of claim 1, wherein the housing is prismatic.

6. The fly trap assembly of claim 1, the outlet hose further comprising:

a first tube extending upwardly from the pump to an upper end of the outer surface of the housing; and a second tube being fluidly coupled to the first tube, the second tube being aligned with the upper end of the outer surface of the housing, the second tube being coextensive with the upper end of the outer surface of the housing wherein the fluid is expelled over an entirety of the upper end whereby the fluid is configured to coat the outer surface as the fluid drains downwardly over the housing into the basin.

7. The fly trap assembly of claim 1, further comprising a power source being electrically coupled to the pump.

8. The fly trap assembly of claim 7, the power source being selected from the group comprising:

a power cord; or a solar panel.

9. The fly trap assembly of claim 1, further comprising a timer being electrically coupled to the pump wherein the pump is actuated upon expiration of the timer.

10. The fly trap assembly of claim 9, further comprising a processor being electrically coupled to the pump, the processor being electrically coupled to the timer, the processor actuating the pump upon expiration of the timer.

11. The fly trap assembly of claim 1, further comprising an inlet hose being coupled to the basin, the inlet hose being fluidly coupled to the pump wherein the fluid is configured to enter the pump through the inlet hose.

12. The fly trap assembly of claim 11, further comprising an inlet valve being coupled to the inlet hose, the inlet valve being openable to permit the fluid to flow into the pump through the inlet hose, the inlet valve being closable to inhibit the fluid from flowing into the pump through the inlet hose.

13. The fly trap assembly of claim 11, further comprising a filter being fluidly coupled to the inlet hose, the filter being configured to inhibit solids from entering the pump.

14. The fly trap assembly of claim 1, further comprising a pressure gauge being coupled to the outlet hose, the pressure gauge being coupled to the pump, the pressure gauge being configured to display a pressure of the fluid exiting the pump through the outlet hose.

15. The fly trap assembly of claim 1, further comprising an outlet valve being coupled to the secondary outlet hose, the outlet valve being openable to facilitate the fluid in flowing into the basin from the secondary outlet hose, the outlet valve being closable to inhibit the fluid from flowing into the basin from the secondary outlet hose.

16. A fly trap assembly comprising:

a basin having a base wall and a peripheral wall being coupled to and extending upwardly from the base wall, the peripheral wall having a top edge defining an opening into the basin;

a fluid being held in the basin, the fluid comprising a mixture, the mixture including water and an adhesive substance such that the mixture is configured to adhesively engage an insect contacting the mixture for trapping the insect;

a housing being positioned in the basin, the housing being coupled to the base wall of the basin, the housing having an outer surface, the outer surface of the housing comprising a metal material being configured to release an infrared heat signature when the outer surface is exposed to sunlight wherein the infrared heat signature is configured to attract the insect to the housing, the housing having a height exceeding a height of the basin wherein the outer surface of the housing has an upper end being positioned above the basin;

a pump being fluidly coupled to the basin, the pump being configured to receive and pressurize the fluid, the pump being coupled to the peripheral wall of the basin, the pump being positioned proximate to the base wall of the basin, the pump extending outwardly from the peripheral wall of the basin;

an outlet hose being fluidly coupled to the pump wherein the pump releases the fluid through the outlet hose, the outlet hose extending upwardly from the pump to the housing wherein the fluid is released from the outlet hose over the outer surface of the housing, the fluid draining downwardly over the outer surface of the housing into the basin, the outlet hose further comprising:

a first tube extending upwardly from the pump to the upper end of the outer surface of the housing;

a second tube being fluidly coupled to the first tube, the second tube being aligned with an upper end of the housing, the second tube being coextensive with the upper end of the outer surface of the housing wherein the fluid is expelled over an entirety of the upper end whereby the fluid is configured to coat the outer surface as the fluid drains downwardly over the housing into the basin;

a plurality of nozzles being fluidly coupled to the outlet hose, the plurality of nozzles being directed toward the upper end of the outer surface of the housing wherein the plurality of nozzles dispenses the fluid over the housing when the fluid is pressurized, each nozzle of the plurality of nozzles being a misting nozzle;

a power source being electrically coupled to the pump, the power source being selected from the group comprising:

a power cord extending outwardly from the pump; or a solar panel being positioned on the pump;

a timer being electrically coupled to the pump wherein the pump is actuated upon expiration of the timer, the timer having a duration between 30.0 seconds and 90.0 minutes;

a processor being electrically coupled to the pump, the processor being electrically coupled to the timer, the processor actuating the pump upon expiration of the timer, the processor being electrically coupled to the power source;

an inlet hose being coupled to the basin, the inlet hose being fluidly coupled to the pump wherein the fluid is configured to enter the pump through the inlet hose;

an inlet valve being coupled to the inlet hose, the inlet valve being openable to permit the fluid to flow into the pump through the inlet hose, the inlet valve being closable to inhibit the fluid from flowing into the pump through the inlet hose, the inlet valve comprising a turn-ball valve;

a filter being fluidly coupled to the inlet hose, the filter being configured to inhibit solids from entering the pump;

a pressure gauge being coupled to the outlet hose, the pressure gauge being coupled to the pump, the pressure gauge being configured to display a pressure of the fluid exiting the pump through the outlet hose;

a pressure control being coupled to the pump wherein the pressure control is configured to facilitate a user in adjusting the pressure of the fluid exiting the pump;

a secondary outlet hose extending from the pump to the basin wherein an excess amount of the fluid flows into the basin from the pump after the fluid is pressurized to maintain the pressure of the fluid exiting the pump, the excess amount of the fluid being determined by the pressure control;

an outlet valve being coupled to the secondary outlet hose, the outlet valve being openable to facilitate the fluid in flowing into the basin from the secondary outlet hose, the outlet valve being closable to inhibit the fluid from flowing into the basin from the secondary outlet hose, the outlet valve comprising a turn-ball valve;

a plurality of brackets being coupled to the upper end of the outer surface of the housing, the plurality of brackets being coupled to the outlet hose wherein the plurality of brackets couples the outlet hose to the housing; and a grate being coupled to the basin, the grate being positioned proximate to the top edge of the peripheral wall of the basin wherein the grate covers the opening, the grate comprising a foraminous material wherein the grate is configured to inhibit the insect from passing into the basin through the grate whereby the grate is configured to define a collection point for the insect when the insect is trapped by the fluid.

* * * * *